United States Patent
Hu

(10) Patent No.: US 8,479,014 B1
(45) Date of Patent: Jul. 2, 2013

(54) SYMMETRIC KEY BASED SECURE MICROPROCESSOR AND ITS APPLICATIONS

(76) Inventor: Guoan Hu, Andover, MA (US)

( * ) Notice: Subject to any disclaimer, the term of this patent is extended or adjusted under 35 U.S.C. 154(b) by 1324 days.

(21) Appl. No.: 11/899,154

(22) Filed: Sep. 4, 2007

(51) Int. Cl.
*G06F 21/00* (2006.01)

(52) U.S. Cl.
USPC ............. 713/189; 713/192; 380/277; 726/26

(58) Field of Classification Search
USPC .......................................................... 713/189
See application file for complete search history.

(56) References Cited

U.S. PATENT DOCUMENTS

| | | | | |
|---|---|---|---|---|
| 5,224,166 A | * | 6/1993 | Hartman, Jr. | 713/190 |
| 5,704,034 A | * | 12/1997 | Circello | 714/38.13 |
| 5,809,530 A | * | 9/1998 | Samra et al. | 711/140 |
| 5,948,095 A | * | 9/1999 | Arora et al. | 712/200 |
| 7,694,151 B1 | * | 4/2010 | Johnson et al. | 713/189 |
| 2002/0112172 A1 | * | 8/2002 | Simmons | 713/193 |
| 2005/0105738 A1 | * | 5/2005 | Hashimoto | 380/277 |

OTHER PUBLICATIONS

Intel Corporation et al., "Advanced Access Content System (AACS)," Feb. 17, 2006, 82 pages.
Actel, "Design Security in Nonvolatile Flash and Antifuse FPGAs,"2006 [retrieved on Oct. 31, 2012], retrieved from Design & Reuse Website, http://www.design-reuse.com/articles/6529/design-security-in-nonvolatile-flash-and-antifuse-fpgas.html, 7 pages.
Hu, "Method and Apparatus for Secure Microprocessor and its Application," U.S. Appl. No. 11/429,563, May 5, 2006, 22 pages.

* cited by examiner

*Primary Examiner* — Yogesh Paliwal
(74) *Attorney, Agent, or Firm* — Houst Consulting

(57) ABSTRACT

An embodiment of the present invention proposes a new secure microprocessor for software protection. The invention presents a secure microprocessor, which embeds a symmetric encryption/decryption hardware a symmetric key (Embedded Key), and a safe cache. The symmetric encryption/decryption is the same for all microprocessors, but the Embedded Key is unique for each microprocessor.

8 Claims, 6 Drawing Sheets

An implementation of the newly invented microprocessor ("Secure Microprocessor").

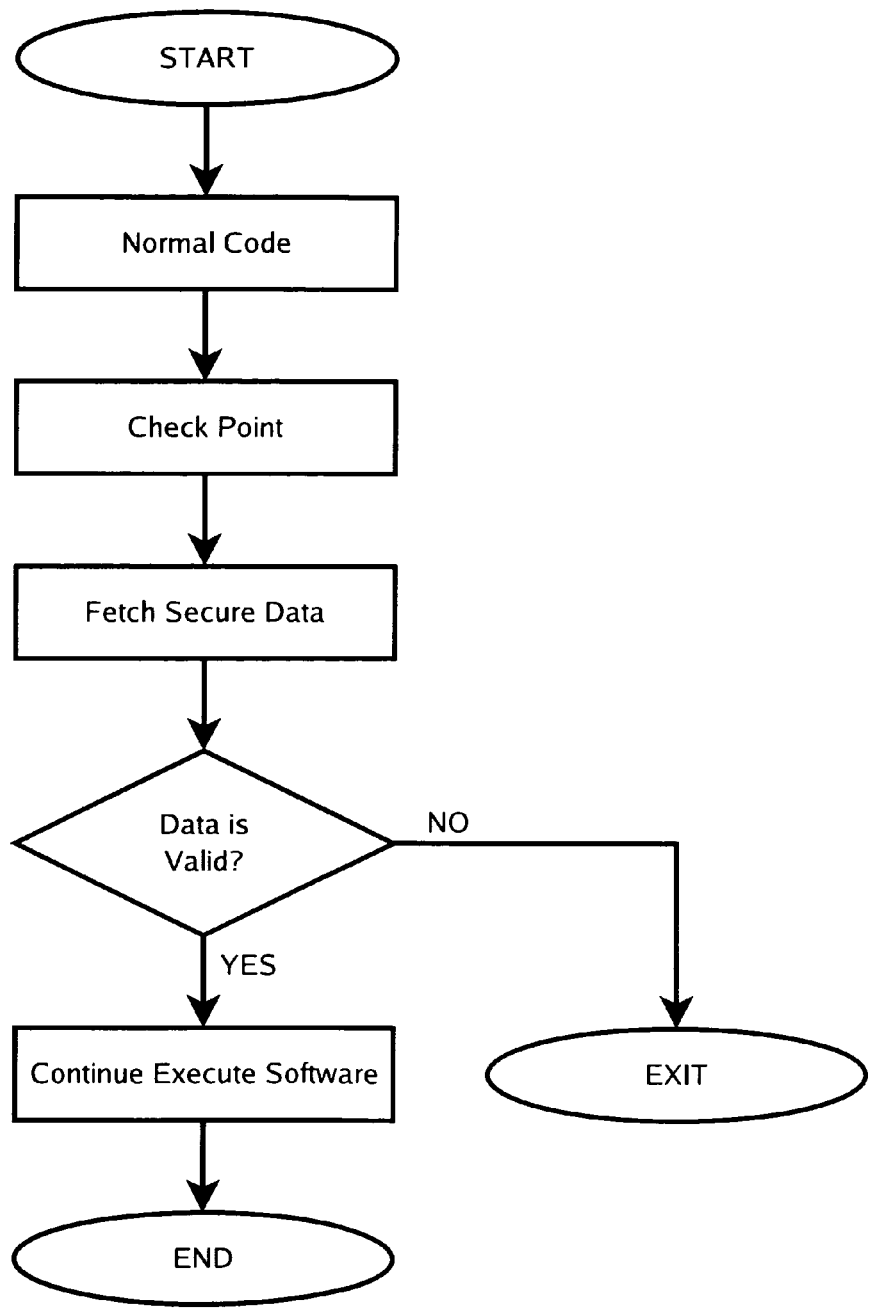
FIG. 1 Illustration of "Prior Art"

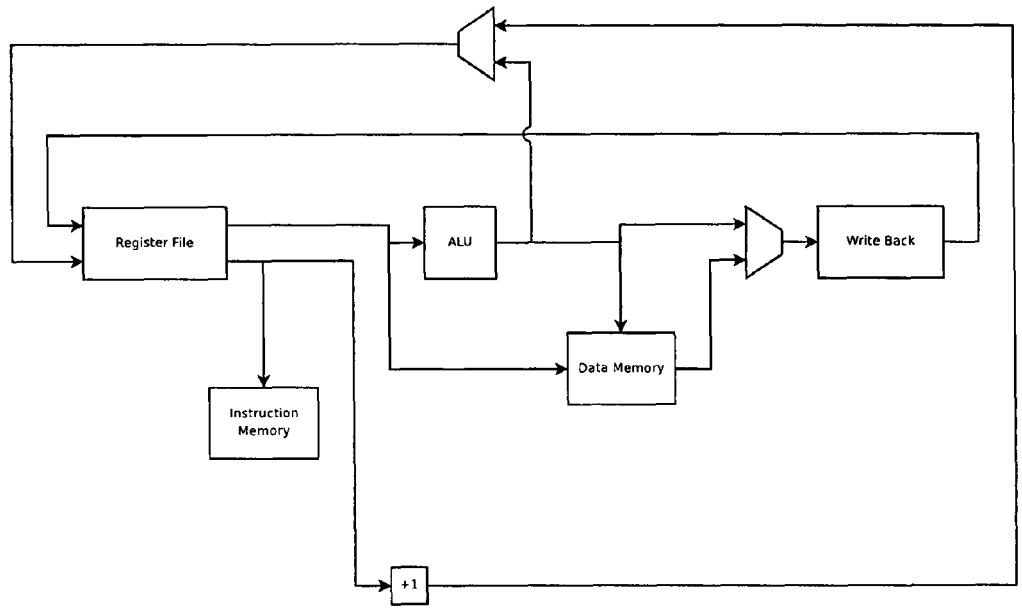
FIG.2 Simple mode of the normal microprocessor.
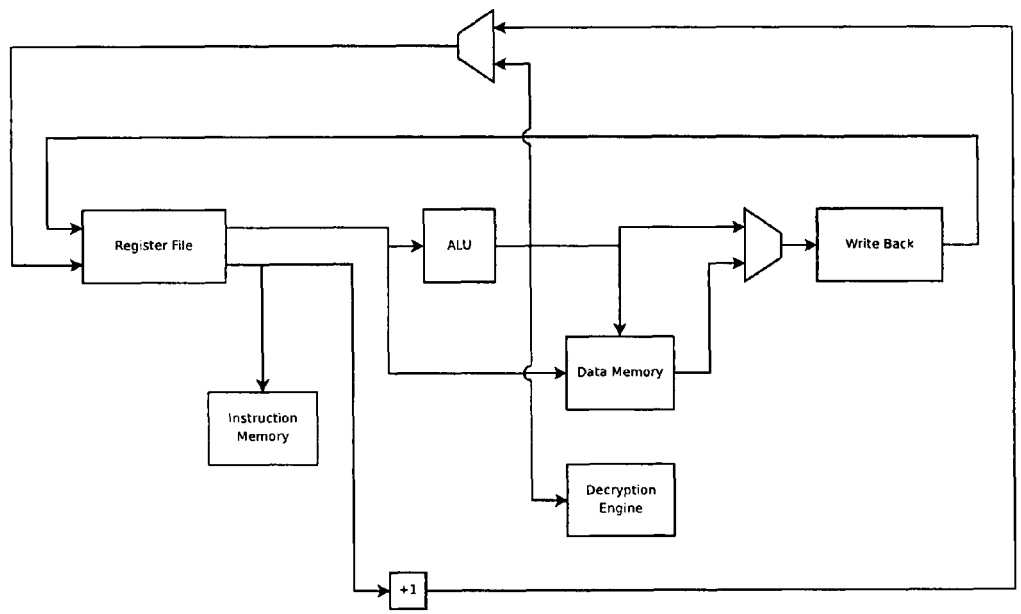
FIG.3 Simple mode of the secure microprocessor.

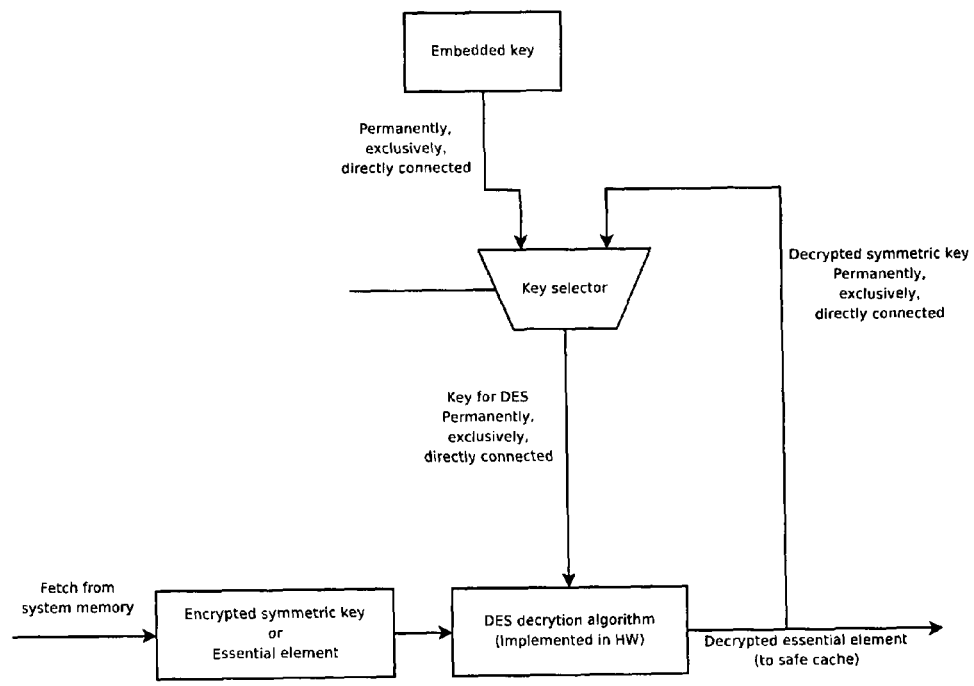
FIG. 4 An implementation of the newly invented microprocessor ("Secure Microprocessor").

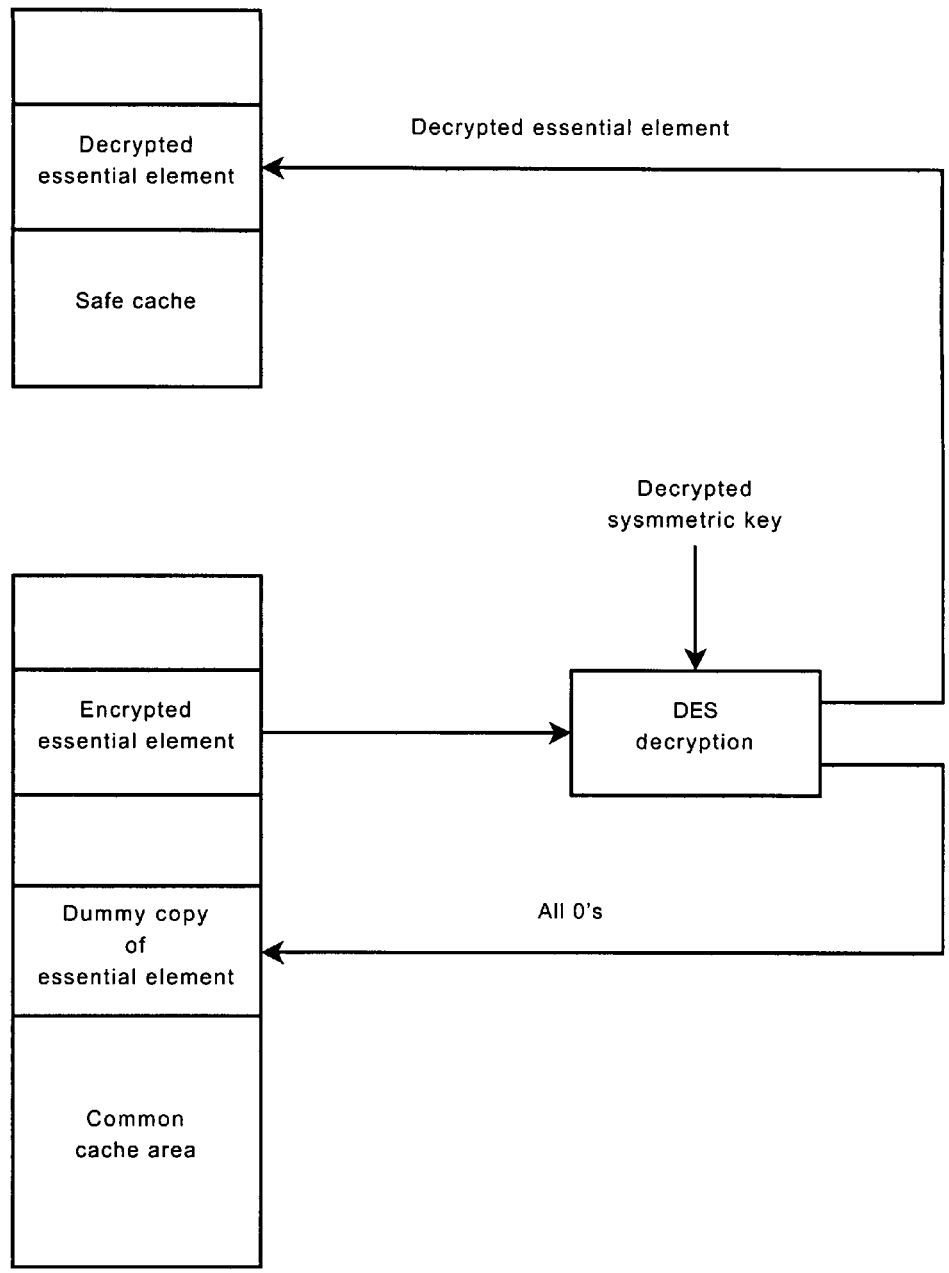
FIG. 5 A possible hardware implementation of the safe cache: decrypted essential element protection.

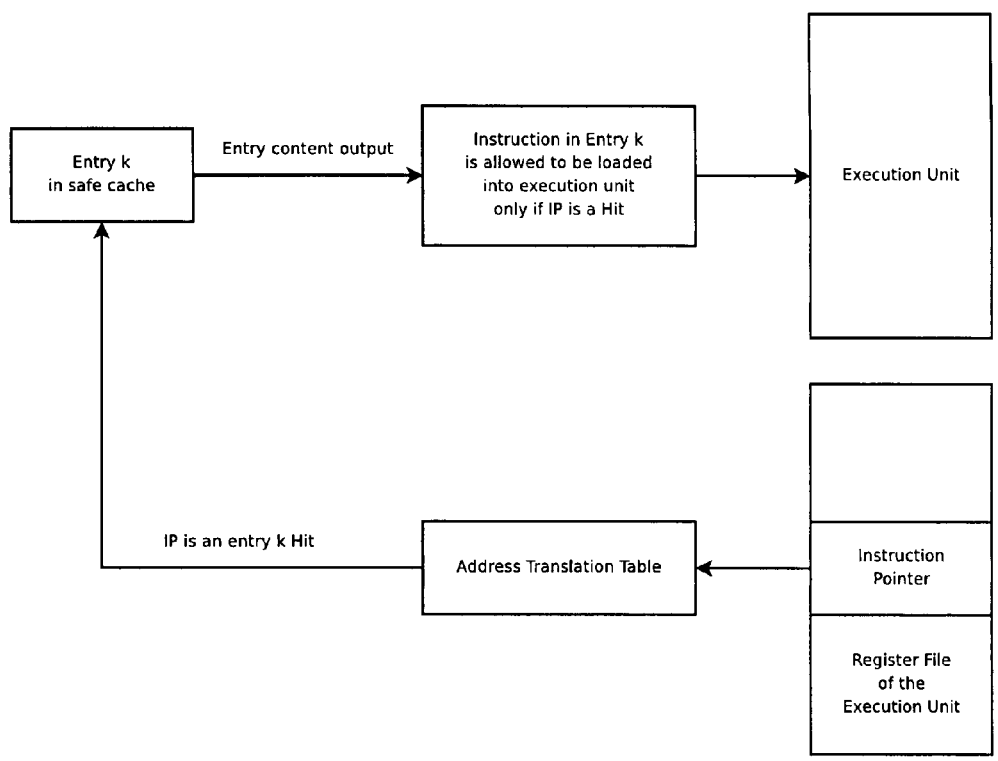
FIG. 6 MOVE protection.

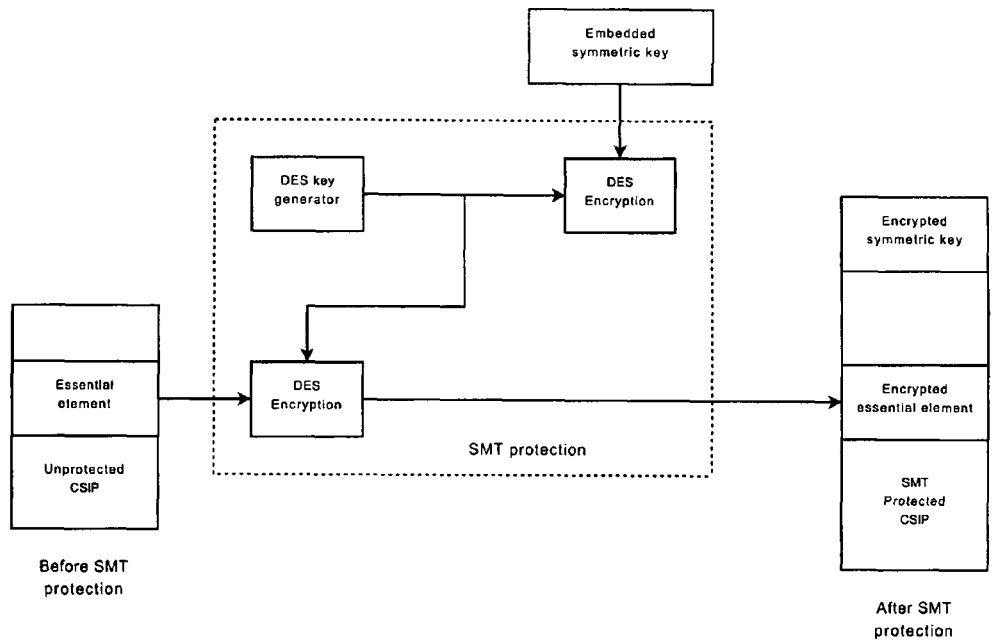
FIG. 7 Software encryption flow.
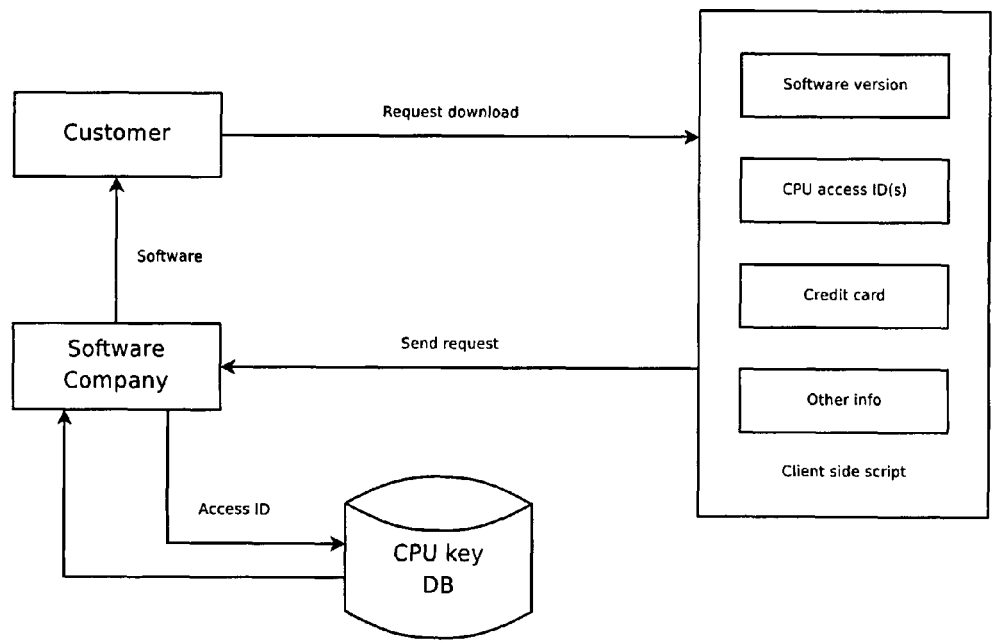
FIG. 8 Secure software distribution flow.

SYMMETRIC KEY BASED SECURE MICROPROCESSOR AND ITS APPLICATIONS

BACKGROUND

Key Words

Microprocessor; Secure microprocessor; Symmetric encrypt/decrypt; Software protection; Software auto-distribution

FIELD OF THE INVENTION

The present invention relates to techniques for microprocessor design, and illegal software reproduction protection. More specifically, the present invention relates to the design of a secure microprocessor, and a software distribution technology for software protection, in such a way that each microprocessor has a unique key, so that one copy of the software can run only on one particular microprocessor, and the protected software could be downloaded online automatically.

RELATED ART

According to BSA (Business Software Alliance), illegal reproduction of Computer Software Intellectual Properties (CSIP) cost software companies the loss of 200 billion dollars in 2005 (and this figure pertains only for PC software). If the piracy of software is reduced even 10%, 2.4 million new jobs could be added to the industry.

On the current market, there are three methods to protect software: (1) hardware-based solutions; (2) software-based solutions; (3) license server solutions. These three methods can also be used together to improve the quality of protection.

Hardware-based solutions normally use hardware, like a PCI card, to store or compute some special data or some instructions.

Software-based solutions normally use a security word, a registration ID, a key disk, etc. When the software begins to run, it requires the user to input a special pass code or to insert a key disk; the program will exit if the pass code or the key disk is not correct.

License server solutions require the computer running the software to connect to the internet. The software will communicate with a license server to obtain the necessary information to allow the software to continue running.

However, hackers can still break all these protection methods. To break hardware-based protection, hackers can emulate the hardware (known as a "watch dog") with software, through tracing the communication between the "dog" and the microprocessor. Software-based protection is even weaker and easier to break; one prominent way to break software protection is to find all the checkpoints within the software and remove them. To break license server protection, hackers can monitor and copy the data transferred back from the license server. Therefore, all current protection methods are easy to break, since they can be traced or emulated, attributable to the fact that they must communicate the original instructions or data to the microprocessor. Once broken, pirated software is easy to share with anyone, even those without expertise in hacking.

The inventor proposed a new secure microprocessor based protection method in a previous U.S. patent application Ser. No. 11/429,563 [1], 2006. In [1], an asymmetric and/or symmetric encryption/decryption hardware or algorithms are embedded into a microprocessor, and each microprocessor is endowed with unique keys. With this technique, any software piracy could be prevented. However, implementation of asymmetric encryption/decryption hardware is very costly in both chip area and chip performance, and it is also a big overhead in configuring the 8K (for a 2048 RSA) bit unique keys for each microprocessor after the chip is packaged.

AACS [2] proposed a DVD copyright protection methodology by embedding a set of the keys into the device. This is different from [1] and the present invention in many ways. The most fundamental different between AACS and [1] (and also this invention) is that by using [1] and this invention technology, the decrypted data is always encapsulated inside the chip, whereas with the AACS technology, the decrypted data will run outside of the chip. If the AACS technique is used in software protection, hackers can always break the code.

SUMMARY

An embodiment of the present invention proposes a new secure microprocessor, and an automatic software distribution technology. The invention presents a secure microprocessor, which ONLY embeds a symmetric decryption hardware and a symmetric key (Embedded Key). The symmetric decryption (which could also be used for encryption) is the same for all microprocessors, but the Embedded Key is unique for each microprocessor. As defined in [1], the Embedded Key is called the "birthmark" of the microprocessor. The invented new secure microprocessor has the same level of robustness to protect the software from illegal reproduction as [1] does, but it will use 10 times less chip area and be 10 times faster when the decoder is embedded into a microprocessor. Moreover, with [1] or any other asymmetrically embedded protection method, a 2048-bit RSA, for example, will need 8K-bit keys to be reconfigured after a microprocessor is manufactured. On the other hand, with the present invention, the embedded symmetric decoder, for example, a 128-bit AES, only needs the 128-bit Embedded Key to be configured for each microprocessor. When we only embed a symmetric decoder in the microprocessor, the big challenge is how to protect the Embedded Key from the hackers. To implement the symmetric Embedded Key protection and fully automatic software encryption and decryption, this invention proposes an automatic, but undefeatable, software compiling and distribution technology. The invention presents methods and apparatus about: (a) How to select none-runtime critical, but important, instructions (Essential Element) to be encrypted; (b) How to encrypt the Essential Element with a random symmetric key; (c) How to encrypt the random symmetric key; (d) How to protect the symmetric key which is embedded in the microprocessor; (e) How to protect the decrypted instructions, or data, by a "safe cache" theory; (f) How to compile and distribute the software automatically via Web Server; and (g) How to reactivate the software when a user changes a computer. In conclusion, the invention is presenting a simple secure microprocessor (by embedding a symmetric decoder ONLY), and providing an automatic way to fully protect the software from illegal reproduction for the software vendor, which is easy to access for the software users. The embedded symmetric decrypt/encrypt hardware, and the unique Embedded Key, a safe cache, prevents the decrypted instructions/data from running outside of the microprocessor, which prevents hackers from debugging the software. The invented software auto-distribution technology will fully protect the symmetric Essential Element of the secure microprocessors to be disclosed.

BRIEF DESCRIPTION OF THE FIGURES

FIG. 1 Illustration of "Prior Art".

FIG. 2 illustrates a simple mode of the normal microprocessor.

FIG. 3 illustrates a simple mode of the secure microprocessor.

FIG. 4 illustrates an implementation of the newly invented microprocessor ("Secure Microprocessor").

FIG. 5 illustrates a possible hardware implementation of the safe cache.

FIG. 6 illustrates the "move" protection.

FIG. 7 illustrates the software encryption flow.

FIG. 8 illustrates the secure software distribution flow.

DETAILED DESCRIPTION

Current Software Protection

FIG. 1 presents an exemplary flowchart of the currently existing software-protection flow.

The protected software starts as normal software. When it reaches a checkpoint, it will receive secure data from certain hardware, such as a small piece of secure hardware, hard disk, or standard input. The data will be decrypted if necessary. The data is then compared to the data in the software. The computer exits the software if the two corresponding data do not match.

There are two ways to break this protection: soft-break and hard-break. Soft-break finds the checkpoints, and then, either obtains the secure data in memory, or modifies the software to detour the checkpoints. Hard-break emulates the hardware that the protection depends upon.

One soft-break method is to find the checkpoints, and modify the software to make it always continue, whether the check is successful or not. The checkpoints are not hard to find because they are always near an exit. A better protection method would be to use the secure data to do computations, and only if the data and computations are correct does the software run correctly. This protection method is more challenging, but still breakable. One way to do so is to monitor the hardware the protection depends upon. The checkpoint is usually nearby when data is read from the hardware; the secure data can then be found in the memory.

Hard-breaking is always possible for hardware-based protection because the small piece of secure hardware that the protection relies upon is usually small and cheap enough to copy or emulate.

New Secure Microprocessor

FIG. 2 shows a simplified normal microprocessor. The basic concept of the Safe Microprocessor Technology (SMT) proposed in this invention is to have built-in symmetric decryption hardware, such as DES, or AES, within the normal microprocessor. FIG. 3 shows the simplified SMT. Furthermore, a built-in unique symmetric key is in each microprocessor. When the microprocessor is in its normal mode, it executes the software normally. When the microprocessor is in its decryption mode, it fetches instructions and decrypts them using the built-in decryption program, which then allows it to execute the instructions as it normally would.

An essential element, or a very important portion, of a CSIP is encrypted with a standardized symmetric encryption algorithm. The encryption key is generated randomly when encrypting the essential element. The key for decrypting the encrypted essential element of the CSIP needs to be decrypted every time the CSIP is executed.

A detailed decryption procedure of the SMT is shown in FIG. 4. AES (or DES) symmetric decryption algorithm is implemented in the hardware. The first inputs to the AES algorithm are from the Embedded Key of the microprocessor and the encrypted Random Symmetric Key of CSIP.

The Embedded Key is embedded within the microprocessor, and it will only be read by a special command, and is stored within special registers (Key-Register), which can never be accessed from outside of the microprocessor.

The encrypted Symmetric Key is embedded within the CSIP, and needs to be fetched from system memory. This requires the CSIP to move the contents of the random encrypted Symmetric Key into a register, and serves as the argument of the function call to the AES algorithm.

The output of the AES algorithm is the decrypted Random Symmetric Key. The Key-Register thus is updated.

The other input to the AES algorithm is the encrypted Essential Element, which needs to be fetched from system memory. This requires the CSIP to move the contents of the encrypted Essential Element into a register of 128 bit per block, which serves as the argument of the function call to the AES algorithm.

The output of the AES function block is the decrypted Essential Element. Each time it will decrypt 128 bit of the Essential Element. The decrypted content will remain valid at the output of the function block until it is moved to an appropriate location. This requires the CSIP to move the decrypted content before decrypting the next block.

To prevent hackers from debugging the code, the decrypted Essential Element should never be accessible from outside the microprocessor. FIG. 5 illustrates a possible hardware implementation of the safe cache.

The encrypted Essential Element is fetched from system memory and resides in the common cache area of the microprocessor. It will be moved through the AES decryption function block for decryption. After decryption, the decrypted Essential Element will be stored within the safe cache area, rather than within the common cache area, with the address assigned by the OS. A dummy copy of the Essential Element with all 0's shall be stored in the location in the common cache area, in which the decrypted Essential Element is supposed to reside.

The safe cache area is an additional cache space to the common cache space. It has the following structure specialties:

(a) The safe cache area is divided into 4 KB per block;
(b) Each block will be dedicated to only one SMT protected CSIP in execution;
(c) Multiple blocks can be used together for a CSIP with an Essential Element larger than 4 KB;
(d) Each block has its own block ID and a status flag for "in use" indication;
(e) When a SMT protected CSIP is executed for decrypting the Essential Element, the DES decryption function block searches through the status flag field and identifies an available block. The block will be marked as "in use" and the block ID will be used as the up bits of the translated address. The block ID will also be remembered so that the status flag will be reset when the execution of the CSIP ends;
(f) Each block consists of multiple entries. Each entry composes of one cache line of the microprocessor;
(g) Each block has its own address translation table for each entry within the block;

(h) Address translation is defined as the conversion from the address in common cache area to the address in the safe cache area. There are 2 address fields in the address translation table for each entry. One field is for storing the address in common cache area, which is used to detect Hit or Miss. The other field is for storing the address in the safe cache area. If there is a Hit, the contents in the safe cache area will be used for execution rather than the contents in the common cache area.

In order to prevent the contents of the safe cache area from being moved to a place where it can be read by software, the safe cache area also has the following specialty:

When the Instruction Pointer (IP) is a safe cache area Hit, and the instruction is a move from the safe cache area, the content in the safe cache area will be allowed to move; otherwise, the contents in the corresponding common cache area will be moved. A content movement into the safe cache area is always allowed. Other than the MOV instruction, any other instruction should be prohibited to execute onto the safe cache area. FIG. 6 illustrates this "move" protection.

Secure Microprocessor Based Software Compiling

To support SMT, the compilers, linkers, and loaders need to be modified. The compilers need to take care of the two pragmas of Begin Essential Element and End Essential Element, and translate them to Begin Secure Mode and End Secure Mode instructions, respectively. Also, the compilers need to record all functions called in the Essential Element into a table. The linkers need to maintain the function table added by the compilers. Additionally, the linkers need to link functions in that table into the final executable. The Loaders need to load the functions called by Essential Element, as well as other functions, into memory.

An Essential Element is defined as an important portion of a CSIP. Without this Essential Element, the CSIP will not be able to function, or an incorrect result will be generated silently. Protecting the Essential Element means protecting the CSIP. This is the objective of SMT. If the image of the decrypted Essential Element is not protected, a reproduced image can be used on any copy of the CSIP to defeat SMT protection.

To prepare CSIP for encryption, the software providers need to identify an Essential Element in the source code of CSIP, add Begin Essential Element pragma at the beginning of the Essential Element, and add End Essential Element pragma at the end of the Essential Element.

The Essential Element of a CSIP is encrypted by a randomly generated symmetric key, used for the symmetric encryption method within the SMT. This random key is encrypted for each particular microprocessor, according the ID of the microprocessor targeted.

The protocol to encrypt the random key is as follows: (a) send the random key and the ID of the microprocessor to the web sever of the microprocessor manufacturer; (b) the web sever will hash the microprocessor's Embedded Symmetric Key according to the ID; (c) the web sever will encrypt the random key using the Embedded Symmetric Key, and send back the encrypted random key, and (d) the software vendor will input the encrypted random key at the beginning of the CSIP.

Optionally, the additional insertion of some instructions in the Essential Element that won't change the functionality of the Essential Element can prevent crackers from monitoring the power consumption of the microprocessor when it is executing the CSIP, and thus guessing from that what instructions are in the Essential Element.

The CSIP can also be targeted to multiple microprocessors by putting the encrypted symmetric keys in a hash table and inputting this hash table at the beginning of the CSIP. FIG. 7 shows a CSIP before and after the SMT encryption.

Secure Microprocessor Based Software Distribute Flow

Because each microprocessor has a unique ID, the web server used to lookup the Embedded Keys utilizes these IDs. FIG. 8. illustrates a secure software distribution flow, in which all Embedded Keys for all released microprocessors are stored in a web server, and hashed by microprocessor IDs. This hash table has no meaning beside its access to Embedded Key from the key server.

When a user purchases software online or from a store, the user provides his or her microprocessor ID. The software company's web sever will generate a random symmetric key, encrypt the Essential Element with the random symmetric key, and then send the random key and the ID to the microprocessor manufacture's web sever. The manufacturer's web sever will hash the microprocessor's Embedded Key, and encrypt the random key with the Embedded Key. Finally, the microprocessor manufacturer's web sever will send the encrypted random key to the software company's web sever, and the software company's web sever will added the encrypted random key at the beginning of the CSIP. It means that the software provider will "manufacture" or "personalize" a unique version of the software according to the user's microprocessor.

From the user's point of view, what he/she experiences is the same as that in a normal download, which may take a few more minutes. The only extra information the user needs to input is the microprocessor ID. The software the user purchased can be automatically decrypted by the user's microprocessor.

It should be indicated that both the user and the software company never know the microprocessor's Embedded Key. The only party that knows the Embedded Keys is the microprocessor manufacturing company. If the hacker queries the web server millions of times for the symmetric key, it is possible to break the Embedded Key. Fortunately, this is not going to happen because the web sever knows that any single microprocessor is not capable of purchasing millions of copies of a software, and will thus block out such repetitive queries.

It should also be noted that the communication between the software makers and the microprocessor manufacturing companies should be via a secure communication channel, which is very mature nowadays.

This invention implements a fully automatic distribution process, while protecting the microprocessor's Embedded Key. When an user pays online, the web sever will automatically link and load the pre-compiled software according to the user's microprocessor ID.

This procedure can not only protect the software vendor from being pirated, but also it will also benefit the microprocessor manufacturers, because all Embedded Keys are stored in the company's web server, and thus only the published access ID of the microprocessor is known to users and software providers. Thus, whenever a software company needs to encrypt a key, it will need to query the microprocessor's web server. This means that the microprocessor company can charge a per-use license fee. Because software companies cannot skip this encryption step, or else users cannot use their software, microprocessor manufacturers benefit immensely from this business flow.

If an user needs to change a computer or reinstall the software, the user can call an "uninstall" program, which will inform the web server to delete the account, and issue a certificate ID (a long string) to the user, so the user can re-download the same software from the web serve by inputting the certificate ID.

For very expensive software, like IC design software, a license sever is currently used. With the present invention, a license sever should still be used, but the license check is embedded together with the essential element of a CSIP and encrypted, so that the hacker can never skip this license check. The license check is different from the current scheme, with the following steps: (a) generate a random string; (b) encrypt the string with the microprocessor using the random key; (c) send the encrypted string to the software company's web sever; (d) the web sever will decrypt the string with the random key; (e) the web sever will send back the decrypted string to the user; (f) the microprocessor will compare the strings; and (g) if the strings do not match, the program will abort, or will silently skip the essential element, so the result will be incorrect. It should be underscored that all the steps from (a) to (f) is executed within the microprocessor, and thus the user can never debug it. This is a marquee difference from the current license sever protection model. It should also be noted that the license string does not need to be encrypted and decrypted within the microprocessor's Embedded Key, but rather, it can be encrypted or decrypted using the software company's random key. This not only reduces the internet traffic flow of the microprocessor manufacturer's web server, but also more securely protects the Embedded Key.

By using the license sever flow model as indicated above, the user will have greater flexibility in changing computers. This also ensures that no one can use the old software after changing computers, because the old account is deleted from the web sever, and the random string can no long be decrypted.

For the extreme situation where an user trashes or otherwise extensively damages his or her computer, and wishes for a credit refund of a purchased software, there could be a printed random ID under the cap of the microprocessor. When one opens the cap, the microprocessor will be damaged beyond use, but the user can be refunded the software credit when he/she submits the printed random ID to the web server.

As a caveat, a hacker could employ chip reverse engineering technology to analyze the layout polygon images to elucidate the Embedded Key. Although this topic is not within the scope of the invention, according to reference [3], only a few national level laboratories in the world can do such reversing engineering for programmable units. For instance, the state of the connection and disconnection of the flash-based switches is only different in the number of electrons. There is therefore no layout geometrical changes to allow easy reverse engineering.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

The terms CPU (Central Processing Unit) and Microprocessor are used interchangeably in this invention, with the latter applicable to computers as well as other electronic devices, such as computer game machines, or any other device with such a processing chip. Any mention of electronic devices containing a microprocessor hence refers to this category of machines.

REFERENCES

[1] Guoan Hu, METHOD AND APPARATUS FOR SECURE MICROPROCESSOR AND ITS APPLICATION, U.S. patent application Ser. No. 11/429,563
[2] Advanced Access Content System (AACS), Introduction and Common Cryptographic Elements, Revision 0.91.
[3] Actel, Design Secure in Nonvolatile Flash and Antifuse FPGAs, Design and reuse, 2006.

What is claimed is:
1. A method of enhancing a microprocessor which comprises a register-file and a first cache, comprising the steps of:
embedding a symmetric encryption/decryption hardware into the microprocessor;
embedding a symmetric key into the microprocessor for the encryption/decryption hardware, which is configured to be known only to a manufacturer of the microprocessor;
embedding a second cache into the microprocessor, which is configured to be inaccessible from outside of the microprocessor, and unable to write-back or write-through to a memory outside of the microprocessor;
adding an address translation table, which translates addresses of the first cache to addresses of the second cache; and
adding a key selector which is configured to select from the symmetric key and an output of the symmetric encryption/decryption hardware;
wherein when fetching an encrypted program from the memory, the encrypted program is decrypted using the symmetric encryption/decryption hardware and stored in the first cache after decryption, and then written to the second cache from the first cache using the address translation table, and garbage instructions are set to an area of the first cache such that when writing-back or writing-through to the memory, the garbage instructions in the area of the first cache are written to the memory.
2. The method of claim 1, further comprising the steps of:
adding a key register which is configured to be inaccessible from outside of the microprocessor;
wherein the symmetric encryption/decryption hardware has key inputs and data inputs;
wherein the key inputs of the symmetric encryption/decryption hardware are hardwired to an output of the key register, and an input of the key register is hardwired to the outputs of the symmetric encryption/decryption hardware;
wherein the outputs of the embedded symmetric encryption/decryption hardware are directly dumped to the second cache or to the key register.
3. The method of claim 1, wherein the second cache is designed to be the following:

when Instruction Pointer (IP) is a Hit of the second cache, and an instruction of MOV from the second cache is provided, contents in the second cache are allowed to be moved; otherwise, the garbage instructions in the area of the first cache are moved.

4. The method of claim 1, wherein the second cache is designed to be the following:
   adding two address fields for each entry of the address translation table;
   using one of the two address fields to store an address of the first cache which is used to detect Hit or Miss;
   using the other one of the two address fields to store an address of the second cache;
   executing contents of the second cache, rather than contents of the first cache, if there is a Hit.

5. The method of claim 1, wherein the register-file of the microprocessor is further configured such that:
   when Instruction Pointer (IP) is a Hit of the second cache, a breakpoint of the microprocessor is disabled.

6. The method of claim 1, wherein an extra control logic is added to toggle the microprocessor between a secure mode and a normal mode where:
   in the normal mode, the microprocessor behaves as a normal microprocessor; and
   in the secure mode, or when Instruction Pointer (IP) is a Hit of the second cache, the microprocessor disables a breakpoint of the microprocessor.

7. A method of enhancing a microprocessor which comprises a register-file and a first cache, comprising the steps of:
   embedding a symmetric encryption/decryption hardware into the microprocessor;
   embedding a symmetric key into the microprocessor for the encryption/decryption hardware, which is configured to be known only to a manufacturer of the microprocessor;
   embedding a second cache into the microprocessor, which is configured to be inaccessible from outside of the microprocessor, and unable to write-back or write-through to a memory outside of the microprocessor;
   adding an address translation table, which translates addresses of the first cache to addresses of the second cache; and
   adding a "begin secure mode" instruction and an "end secure mode" instruction to an encrypted program;
   adding a key register to the microprocessor which is configured to be inaccessible from outside of the microprocessor;
   wherein when executing instructions between the "begin secure mode" instruction and the "end secure mode" instruction, the microprocessor does the following:
   fetching an encrypted key from the encrypted program;
   decrypting the encrypted key using the symmetric key and the symmetric encryption/decryption hardware embedded within the microprocessor to obtain a decrypted key, and storing the decrypted key in the second cache or in the key register; and
   decrypting instructions between the "begin secure mode" instruction and the "end secure mode" instruction using the decrypted key and the symmetric encryption/decryption hardware embedded within the microprocessor to obtain decrypted instructions, storing the decrypted instructions to the second cache, and setting a corresponding area of the first cache to garbage instructions.

8. The method of claim 7, wherein when executing instructions between the "begin secure mode" instruction and the "end secure mode" instruction, the decrypted keys, the decrypted instructions, and intermediate results are kept within the microprocessor to prevent a hacker from debugging the encrypted instructions.

* * * * *